Figure 1:
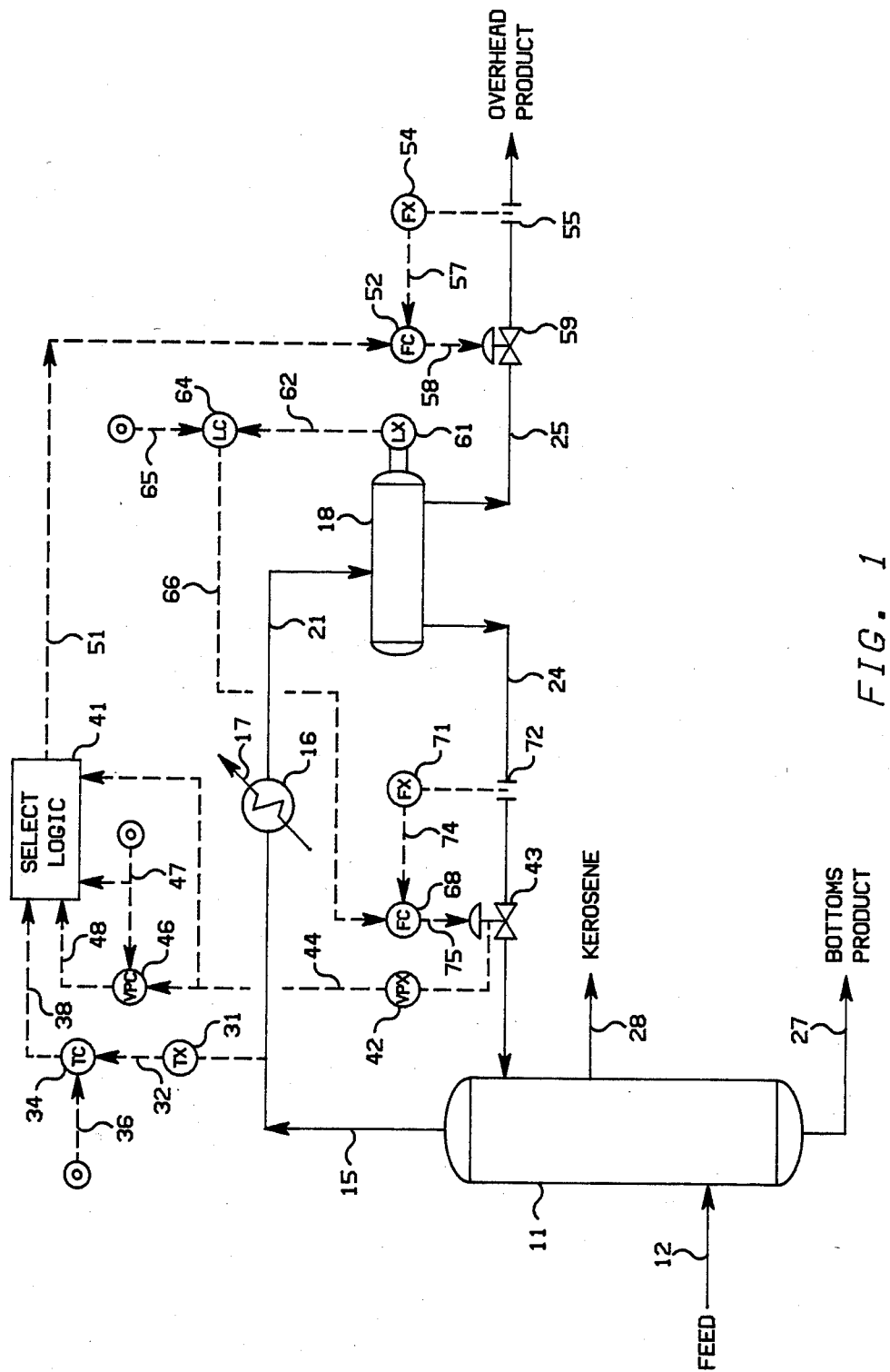

United States Patent [19]

Stengle et al.

[11] Patent Number: 4,557,806
[45] Date of Patent: Dec. 10, 1985

[54] FRACTIONAL DISTILLATION PROCESS CONTROL

[75] Inventors: Nancy K. Stengle; James W. Hobbs, both of Sweeny, Tex.

[73] Assignee: Phillips Petroleum Company, Bartlesville, Okla.

[21] Appl. No.: 692,086

[22] Filed: Jan. 17, 1985

[51] Int. Cl.$^4$ ............................................. B01D 3/42
[52] U.S. Cl. ........................................ 203/1; 203/2; 203/DIG. 19; 196/132; 202/160; 208/DIG. 1; 364/501
[58] Field of Search ................. 203/1, 2, DIG. 19, 99, 203/DIG. 18; 202/160, 181; 196/132, 141; 208/DIG. 1; 364/501; 62/21, 37; 55/18

[56] References Cited

U.S. PATENT DOCUMENTS

| | | | |
|---|---|---|---|
| 3,018,230 | 1/1962 | Morgan | 203/3 |
| 3,294,648 | 12/1966 | Lupfer et al. | 203/2 |
| 3,600,283 | 8/1971 | Bollen et al. | 203/2 |
| 3,967,937 | 7/1976 | Hobbs | 55/18 |
| 4,111,218 | 9/1978 | Hobbs | 203/1 |
| 4,230,533 | 10/1980 | Giroux | 203/DIG. 19 |
| 4,348,259 | 9/1982 | Jensen | 203/DIG. 19 |
| 4,377,443 | 3/1983 | Tuck et al. | 203/1 |

*Primary Examiner*—Wilbur Bascomb
*Attorney, Agent, or Firm*—French and Doescher

[57] ABSTRACT

In a fractional distillation process in which a sidedraw product stream is withdrawn from the fractional distillation column, the flow rate of the overhead product stream is controlled so as to increase the flow of the upper external reflux so as to drop as much as possible of the overhead product into the sidedraw product stream. However, valve position control is utilized to override the control of the flow of the overhead product stream, which is being controlled so as to substantially maximize the flow of the sidedraw product stream, if the valve controlling the flow of the upper external reflux approaches fully open such that control of the liquid level in the overhead accumulator associated with the fractional distillation process is not lost.

10 Claims, 1 Drawing Figure

FRACTIONAL DISTILLATION PROCESS CONTROL

This invention relates to control of a fractional distillation process. In one aspect, this invention relates to method and apparatus for maintaining a desired overhead vapor temperature for a fractional distillation process without losing control of the liquid level in the overhead accumulator associated with the fractional distillation process.

Fractional distillation columns are employed in many processes to make desired separations. The separations may range from single component separations to the more complex multiple separations performed by crude distillation towers. Typically, a feed stream containing at least first and second components is supplied to the fractional distillation column. A substantial portion of the first component contained in the feed stream is removed from the fractional distillation column as an overhead product and a substantial portion of the second component in the feed stream is removed from the fractional distillation process as a bottoms product. Heat is generally supplied to the fractional distillation column in order to effect the desired separation or the feed may be preheated.

In many fractional distillation processes such as crude distillation, fractionation of the effluent from a catalytic cracker, hydrodesulfurizing fractionators, vacuum towers and coker fractionators, a plurality of sidedraw streams will be withdrawn in addition to the overhead stream and the bottoms stream. In some modes of operation, it is desired to drop as much of the overhead product as possible back into such sidedraw streams. This implies that the upper external reflux to the fractional distillation column must be maximized. However, since the liquid level in the overhead accumulator associated with the fractional distillation process is typically manipulated by controlling the flow of the upper external reflux, maximizing the upper external reflux can sometimes result in a loss of liquid level control since the valve controlling the flow of the upper external reflux may become fully opened.

It is thus an object of this invention to provide method and apparatus whereby the flow rate of the upper external reflux can be maximized to the extent possible without losing control of the liquid level in the overhead accumulator.

In accordance with the present invention, method and apparatus is provided whereby valve position control is utilized to override control of the flow of the overhead product, which is being controlled so as to substantially maximize the flow of the sidedraw product, if the valve controlling the flow of the upper external reflux approaches fully opened. This insures that the valve controlling the flow of the upper external reflux does not become fully opened which enables control of the liquid level in an overhead accumulator to be maintained.

Other objects and advantages of the invention will be apparent from the foregoing brief description of the invention and the claims as well as the detailed description of the drawing which is briefly described as follows:

FIG. 1 is a diagrammatic illustration of a fractional distillation process and the associated control system of the present invention.

The invention is illustrated in terms of a fractional distillation process in which fuel oil is fractionated. However, the invention is applicable to any fractional distillation process where at least one sidedraw stream is withdrawn from the fractional distillation process and it is desired to drop as much as possible of the overhead product stream to such sidedraw product stream.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that, if a flow is measured in pneumatic form, it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention for the select logic. Analog computers or other types of computing devices could also be used in the invention. A digital computer which may be used is an OPTROL 7000 Process Computer System from Applied Automation, Inc., Bartlesville, Okla.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11. A fuel oil feed is provided to the fractional distillation column 11 through conduit 12. The feed flowing through conduit 12 may be preheated and/or additional heat may be provided to the fractional distillation column by circulating steam or other heating fluids through the lower portion of the fractional distillation column 11. Also, a reboiler may be used.

An overhead vapor stream is withdrawn from the upper portion of the distillation column 11 through conduit 15. The overhead vapor stream flowing through conduit 15 is provided to the heat exchanger 16. The heat exchanger 16 is provided with a cooling fluid through conduit 17. The at least partially condensed fluid stream from the heat exchanger 16 is provided to the overhead accumulator 18 through conduit 21. A first portion of the liquid in the overhead accumulator 18 is provided through conduit 24 as an upper external reflux to the fractional distillation column 11. A second portion of the liquid in the accumulator 18 is removed through conduit 25 as the overhead product which is naphtha.

A bottoms stream containing a diesel product is withdrawn from the fractional distillation column 11 through conduit 27.

A kerosene sidedraw product stream is illustrated as being withdrawn through conduit 28. However, it should be recognized that separation apparatus will generally be associated with the withdrawal of the kerosene sidedraw stream. However, such separation apparatus plays no part in the present invention and has not been illustrated for the sake of clarity.

As described to this point, the fractional distillation column illustrated in FIG. 1 is a conventional fractional distillation column. Other conventional fractional distillation process equipment such as pumps, additional heat exchangers, etc. would also typically be utilized. However, such additional process equipment have not been illustrated for the sake of clarity since such additional process equipment plays no part in the present invention.

The manner in which the fractional distillation process illustrated in FIG. 1 is controlled in accordance with the present invention is as follows:

Temperature transducer 31 in combination with a temperature measuring device such as a thermocouple, which is operably located in conduit 15, provides an output signal 32 which is representative of the actual temperature of the overhead vapor flowing through conduit 15. Signal 32 is provided as the process variable input to the temperature controller 34.

The temperature controller 34 is also provided with a set point signal 36. For the mode of operation where it is desired to minimize the flow of the overhead product and maximize the flow of the kerosene sidedraw product, the temperature represented by signal 36 will be set low so as to force an increased flow rate of the upper external reflux flowing through conduit 24. Signal 36 is thus representative of the desired temperature of the overhead vapor flowing through conduit 15 for the particular mode of operation where the flow of the overhead product is minimized.

In response to signals 32 and 36, the temperature controller 34 provides an output signal 38 which is responsive to the difference between signals 32 and 36. Signal 38 is scaled so as to be representative of the flow rate of the naphtha overhead product flowing through conduit 25 required to maintain the actual temperature of the overhead vapor flowing through conduit 15 substantially equal to the desired temperature represented by signal 36. Signal 38 is provided from the temperature controller 34 as a first input to the select logic 41.

Control valve 43 is operably located in conduit 24 so as to manipulate the flow of the upper external reflux. Valve position transducer 42 provides an output signal 44 which is representative of the actual position of control valve 43. Signal 44 is provided as the process variable input to the valve position controller 46 and is also provided as an input to the select logic 41.

Valve position controller 46 is also provided with a set point signal 47 which is representative of the desired maximum opening of the control valve 43. Signal 47 is also provided to the select logic 41. The magnitude of signal 47 will be selected such that the flow rate of the upper external reflux may be maximized to the extent possible without losing control of the liquid level in the overhead accumulator 18. A typical value for signal 47 is 95 percent open.

In response to signals 44 and 47, the valve position controller 46 provides an output signal 48 which is responsive to the difference between signals 44 and 47. Signal 48 is scaled so as to be representative of the flow rate of the overhead product through conduit 25 required to maintain the actual position of the control valve 43 substantially equal to the maximum open position represented by signal 47. Signal 48 is provided from the valve position controller 46 as an input to the select logic 41.

In the select logic 41, either signal 38 or signal 48 is selected to be output as signal 51. This is accomplished by setting signal 51 equal to signal 38 if the valve position represented by signal 44 is less than the valve position represented by the set point signal 47. However, if the valve position represented by signal 44 is greater than or equal to the valve position represented by the set point signal 47, the output signal 51 is set equal to signal 48. Thus, assuming the set point signal 47 is equal to 95 percent fully opened, the control system will maintain the desired overhead vapor temperature until such time as the control valve 43 becomes 95 percent fully open. If this occurs, then the control system will operate to prevent the control valve 43 from becoming more than 95 percent fully open until such time as liquid level control allows the control valve 43 to become less than 95 percent open at which time temperature control will be resumed.

Signal 51, which is representative of the desired flow rate of the overhead product stream, is provided as the set point input to the flow controller 52.

Flow transducer 54 in combination with the flow sensor 55, which is operably located in conduit 25, provides an output signal 57 which is representative of the actual flow rate of the overhead product through conduit 25. Signal 57 is provided from the flow transducer 54 as the process variable input to the flow controller 52.

In response to signals 51 and 57, the flow controller 52 provides an output signal 58 which is responsive to the difference between signals 51 and 57. Signal 58 is scaled so as to be representative of the position of the control valve 59, which is operably located in conduit 25, required to maintain the actual flow rate of the overhead product substantially equal to the desired flow rate represented by signal 51. Signal 58 is provided from the flow controller 52 as a control signal for control valve 59 and control valve 59 is manipulated in response thereto.

Level transducer 61 provides an output signal 62 which is representative of the actual liquid level in the overhead accumulator 18. Signal 62 is provided as the process variable input to the level controller 64.

The level controller 64 is also provided with a set point signal 65 which is representative of the desired liquid level in the overhead accumulator 18. This liquid level will be determined by process constraints associated with the physical characteristics of the overhead accumulator 18.

In response to signals 62 and 65, the level controller 64 provides an output signal 66 which is responsive to the difference between signals 62 and 65. Signal 66 is scaled so as to be representative of the flow rate of the upper external reflux through conduit 24 required to maintain the actual liquid level in the overhead accumulator 18 substantially equal to the desired liquid level represented by signal 65. Signal 66 is provided from the level controller 64 as the set point input to the flow controller 68.

Flow transducer 71 in combination with the flow sensor 72, which is operably located in conduit 24, provides an output signal 74 which is representative of the actual flow rate of the upper external reflux through conduit 24. Signal 74 is provided from the flow transducer 71 as the process variable input to the flow controller 68.

In response to signals 66 and 74, the flow controller 68 provides an output signal 75 which is responsive to the difference between signals 66 and 74. Signal 75 is scaled so as to be representative of the position of the control valve 43 required to maintain the actual flow rate of the upper external reflux through conduit 24 substantially equal to the desired flow rate represented by signal 66. Signal 75 is provided from the flow controller 68 as the control signal for control valve 43 and control valve 43 is manipulated in response thereto.

In summary, the mode of operation is such that the overhead product flow rate is minimized and the flow of the kerosene sidedraw product is maximized.

This is accomplished by setting a low temperature for the overhead vapor stream which forces a reduced flow rate of the overhead product stream. This reduced flow rate will cause an increased flow rate of the upper external reflux so as to maintain a desired liquid level in the overhead accumulator. This increased flow rate of the upper external reflux provides the desired result of increasing the flow of the kerosene sidedraw product stream as opposed to the flow of the overhead product stream.

Without intervening control, control valve 43 could be driven fully opened. At this point, control of the liquid level in the overhead accumulator would be lost which is highly undesirable. This is prevented in accordance with the present invention by using valve position control to override the temperature control so that the control system based on temperature control will not drive the control valve 43 fully opened. In this manner, the flow rate of the external reflux is maximized to the extent possible without losing control of the liquid level in the overhead accumulator which is the desired result.

The invention has been described in terms of a preferred embodiment as illustrated in FIG. 1. Suitable control components such as flow transducers 54 and 71; flow sensors 72 and 75; flow controllers 68 and 52; level transducer 61; level controller 64; temperature transducer 31; temperature controller 34; valve position transducer 42; valve position controller 46 and control valves 59 and 43 are each well known, commercially available control components such as are described at length in Perry's Chemical Engineer's Handbook, 4th Edition, chapter 22, McGraw-Hill.

As previously stated, the select logic 41 is preferably implemented on a digital computer. It is also noted that the various controller functions illustrated in FIG. 1 could also be implemented on a digital computer if desired.

While the invention has been described in terms of a presently preferred embodiment, reasonable variations and modifications are possible by those skilled in the art. Such variations and modifications are within the scope of the present invention, as claimed.

That which is claimed is:

1. Apparatus comprising:

a fractional distillation column;

means for providing a feed stream to said fractional distillation column, wherein components contained in said feed stream are at least partially separated in said fractional distillation column;

means for withdrawing an overhead vapor stream from an upper portion of said fractional distillation column;

means for condensing at least a portion of said overhead vapor stream;

an overhead accumulator;

means for passing the resulting at least partially condensed overhead stream into said overhead accumulator;

means for withdrawing condensate from said overhead accumulator and for passing a first portion of the thus withdrawn condensate into an upper portion of said fractional distillation column as an upper external reflux stream and for passing a second portion of the thus withdrawn condensate as an overhead product stream;

means for withdrawing a sidedraw product stream from said fractional distillation column;

means for establishing a first signal representative of the flow rate of said overhead product stream required to maintain a desired temperature for said overhead vapor stream, wherein the desired temperature of said overhead vapor stream is such as will substantially maximize the flow of said sidedraw product stream;

a first control valve operably located so as to control the flow of said upper external reflux stream;

means for establishing a second signal representative of the actual position of said first control valve;

means for establishing a third signal representative of the desired maximum open position of said first control valve;

means for comparing said second signal and said third signal and for establishing a fourth signal which is responsive to the difference between said second signal and said third signal, wherein said fourth signal is scaled so as to be representative of the flow rate of said overhead product stream required to maintain the actual position of said first control valve substantially equal to the desired maximum open position represented by said third signal;

select logic means;

means for providing said first, second, third and fourth signals to said select logic means, wherein said select logic means establishes a fifth signal which is equal to the magnitude of said first signal if the magnitude of said second signal is less than the magnitude of said third signal and which is equal to the magnitude of said fourth signal if the magnitude of said second signal is greater than or equal to the magnitude of said third signal;

means for manipulating the flow of said overhead product stream in response to said fifth signal;

means for establishing a sixth signal representative of the flow rate of said upper external reflux required to maintain a desired liquid level in said accumulator; and means for manipulating said first control valve in response to said sixth signal so as to maintain the actual flow rate of said upper external reflux substantially equal to the flow rate represented by said sixth signal.

2. Apparatus in accordance with claim 1 wherein said means for establishing said first signal comprises:

means for establishing a seventh signal representative of the actual temperature of said overhead vapor stream;

means for establishing an eighth signal representative of the desired temperature of said overhead vapor stream; and means for comparing said seventh signal and said eighth signal and for establishing said first signal which is responsive to the difference between said seventh signal and said eighth signal.

3. Apparatus in accordance with claim 1 wherein said means for manipulating the flow rate of said overhead product stream in response to said fifth signal comprises:

a second control valve operably located so as to control the flow of said overhead product stream;

means for establishing a seventh signal representative of the actual flow rate of said overhead product stream;

means for comparing said fifth signal and said seventh signal and for establishing an eighth signal which is responsive to the difference between said fifth signal and said seventh signal, wherein said eighth signal is scaled so as to be representative of the position of said second control valve required to maintain the actual flow rate of said overhead product stream substantially equal to the desired flow rate represented by said fifth signal; and means for manipulating said second control valve in response to said eighth signal.

4. Apparatus in accordance with claim 1 wherein said means for establishing said sixth signal comprises:

means for establishing a seventh signal representative of the actual liquid level in said overhead accumulator;

means for establishing an eighth signal representative of the desired liquid level in said overhead accumulator; and means for comparing said seventh signal and said eighth signal and for establishing said sixth signal which is responsive to the difference between said seventh signal and said eighth signal.

5. Apparatus in accordance with claim 4 wherein said means for manipulating said first control valve in response to said sixth signal comprises:

means for establishing a ninth signal representative of the actual flow rate of said upper external reflux stream;

means for comparing said sixth signal and said ninth signal and for establishing a tenth signal which is responsive to the difference between said sixth signal and said ninth signal, wherein said tenth signal is scaled so as to be representative of the position of said first control valve required to maintain the flow rate of said upper external reflux stream substantially equal to the desired flow rate represented by said sixth signal; and means for manipulating said first control valve in response to said tenth signal.

6. A method for controlling a fractional distillation column utilized to separate components contained in a feedstream in such a manner that the flow rate of a sidedraw product stream withdrawn from said fractional distillation column is maximized without losing control of the liquid level in an overhead accumulator associated with said fractional distillation column, wherein an overhead vapor stream is withdrawn from an upper portion of said fractional distillation column, at least partially condensed, and provided to said overhead accumulator, wherein a first portion of the condensate in said overhead accumulator is provided as an upper external reflux to an upper portion of said fractional distillation column and wherein a second portion of the condensate in said overhead accumulator is withdrawn as an overhead product stream, said method comprising the steps of:

establishing a first signal representative of the flow rate of said overhead product stream required to maintain a desired temperature for said overhead vapor stream, wherein the desired temperature of said overhead vapor stream is such as will substantially maximize the flow of said sidedraw product stream;

establishing a second signal representative of the actual position of a first control valve operably located so as to control the flow of said upper external reflux stream;

establishing a third signal representative of the desired maximum open position of said first control valve;

comparing said second signal and said third signal and establishing a fourth signal which is responsive to the difference between said second signal and said third signal, wherein said fourth signal is scaled so as to be representative of the flow rate of said overhead product stream required to maintain the actual position of said first control valve substantially equal to the desired maximum open position represented by said third signal;

establishing a fifth signal which is equal to the magnitude of said first signal if the magnitude of said second signal is less than the magnitude of said third signal and which is equal to the magnitude of said fourth signal if the magnitude of said second signal is greater than or equal to the magnitude of said third signal;

manipulating the flow of said overhead product stream in response to said fifth signal;

establishing a sixth signal representative of the flow rate of said upper external reflux required to maintain a desired liquid level in said accumulator; and manipulating said first control valve in response to said sixth signal so as to maintain the actual flow rate of said upper external reflux substantially equal to the flow rate represented by said sixth signal.

7. A method in accordance with claim 6 wherein said step of establishing said first signal comprises:

establishing a seventh signal representative of the actual temperature of said overhead vapor stream;

establishing an eighth signal representative of the desired temperature of said overhead vapor stream; and comparing said seventh signal and said eighth signal and establishing said first signal which is responsive to the difference between said seventh signal and said eighth signal.

8. A method in accordance with claim 6 wherein said step of manipulating the flow rate of said overhead product stream in response to said fifth signal comprises:

establishing a seventh signal representative of the actual flow rate of said overhead product stream;

comparing said fifth signal and said seventh signal and establishing an eighth signal which is responsive to the difference between said fifth signal and said seventh signal, wherein said eighth signal is scaled so as to be representative of the position of a second control valve, which is operably located so as to control the flow of said overhead product stream, required to maintain the actual flow rate of said overhead product stream substantially equal to the desired flow rate represented by said fifth signal; and manipulating said second control valve in response to said eighth signal.

9. A method in accordance with claim 6 wherein said step of establishing said sixth signal comprises:

establishing a seventh signal representative of the actual liquid level in said overhead accumulator;

establishing an eighth signal representative of the desired liquid level in said overhead accumulator; and comparing said seventh signal and said eighth signal and establishing said sixth signal which is responsive to the difference between said seventh signal and said eighth signal.

10. A method in accordance with claim 9 wherein said step of manipulating said first control valve in response to said sixth signal comprises:

establishing a ninth signal representative of the actual flow rate of said upper external reflux stream;

comparing said sixth signal and said ninth signal and establishing a tenth signal which is responsive to the difference between said sixth signal and said ninth signal, wherein said tenth signal is scaled so as to be representative of the position of said first control valve required to maintain the flow rate of said upper external reflux stream substantially equal to the desired flow rate represented by said sixth signal; and manipulating said first control valve in response to said tenth signal.

* * * * *